United States Patent [19]

Galbraith, Jr.

[11] 4,003,062
[45] Jan. 11, 1977

[54] CAMERA FILTER POSITIONING APPARATUS
[75] Inventor: Floyd Malcolm Galbraith, Jr., Rochester, N.Y.
[73] Assignee: Eastman Kodak Company, Rochester, N.Y.
[22] Filed: Dec. 5, 1975
[21] Appl. No.: 638,128
[52] U.S. Cl. .................................. 354/21; 354/59; 354/126
[51] Int. Cl.² .................. G03B 7/00; G03B 11/00
[58] Field of Search ............... 354/21, 49, 59, 202, 354/275, 126, 127, 128, 129; 352/78 C

[56] References Cited
UNITED STATES PATENTS

| 3,425,326 | 2/1969 | Wasielewski | 354/21 |
| 3,601,021 | 8/1971 | Easterly | 354/21 |
| 3,602,117 | 8/1971 | Eagle | 354/21 |
| 3,625,125 | 12/1971 | Iida | 354/21 |
| 3,662,666 | 5/1972 | Neudecker et al. | 354/126 |
| 3,667,362 | 6/1972 | Neudecker et al. | 354/21 |
| 3,678,827 | 7/1972 | Eagle et al. | 354/21 |

FOREIGN PATENTS OR APPLICATIONS

| 1,217,203 | 5/1966 | Germany | 354/129 |

Primary Examiner—Edna M. O'Connor
Attorney, Agent, or Firm—J. L. Palmer

[57] ABSTRACT

A camera adapted to selectively receive and expose film having different effective film speeds, under both ambient and artificial illumination, the film speed being encoded on film carrying means, includes apparatus to move a filter into the exposure path of a lens axis of the camera when a flash unit is mounted on the camera and apparatus to sense the encoded film speed and to prevent the movement of the filter into the exposure path if film of relatively low speed is in the camera.

2 Claims, 6 Drawing Figures

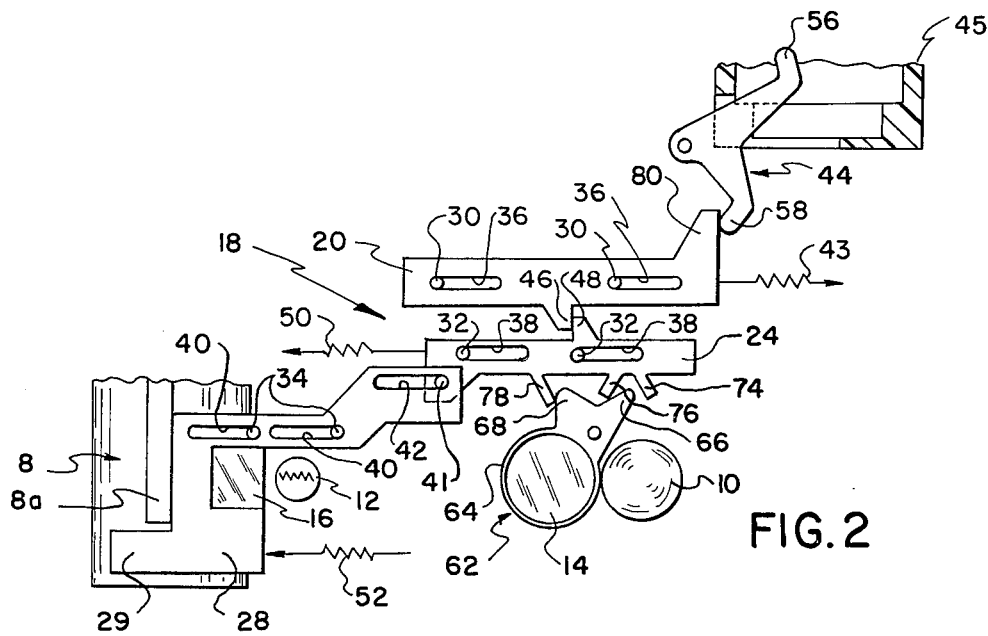

CAMERA FILTER POSITIONING APPARATUS

BACKGROUND OF THE INVENTION

1. Field of the Invention

The present invention relates to a camera adapted to expose film of widely different film speeds in which apparatus is provided for selectively positioning an exposure-regulating filter over a lens (aperture) of the camera when a flash unit is mounted on the camera and for preventing positioning of the filter when film of relatively low speed is in the camera.

2. Discussion of the Prior Art

By being selective in the combination of diaphragm settings and shutter speeds provided, a camera can be designed that will automatically adjust exposure parameters to properly expose film of more than one effective ASA rating. However, the design may be impractical from an economic or performance standpoint for a number of reasons. From a performance standpoint, for example, a very small aperture and fast shutter speed may be required to produce the proper total exposure of high-speed film in normal lighting. If a cadmium sulfide photosensor, which has a slow response to low ambient or changing light is used, shutter speeds attainable are not fast enough to provide proper exposure with the smallest useful diaphragm settings available. The required diaphragm opening would be so small that diffraction would result. Alternatively, if a silicon photosensor, which has a fast response to light is used to achieve faster shutter speeds, the speed desired may be difficult to achieve mechanically.

Therefore, it becomes advantageous to utilize neutral density correction in the exposure system to provide the number of available stops of exposure to accommodate the different film speeds. Neutral density correction may be used for a lens aperture or for a photosensor that is part of an exposure control circuit. Thus, it is desirable to have exposure-control apparatus that senses the speed of the film being used and also senses when a flash unit is mounted on the camera and selectively positions respective filters over the lens aperture or photosensor as required to effect proper exposure for the speed of film in the camera.

SUMMARY OF THE INVENTION

In a preferred embodiment of the invention, a camera adapted to expose film of widely different effective film speeds, the film speeds being encoded on a film carrying means, includes apparatus that positions a filter in the path of a lens axis of the camera when a flash unit is mounted on the camera and apparatus that senses the encoded film speed and renders the filter positioning apparatus ineffective when film of relatively low speed is in the camera.

Additionally, the camera includes a photosensor and associated circuitry to control exposure in accordance with scene illumination and a second filter movable into and out of operative relationship with the photosensor. The apparatus that senses the encoded film speed moves the second filter into operative relationship with the photosensor in response to sensing that film of relatively low speed in the camera.

BRIEF DESCRIPTION OF THE DRAWINGS

In the detailed description of the preferred embodiment of the invention presented below, reference is made to the accompanying drawing in which:

FIGS. 1a and b illustrate a film cartridge including a rib at one end having a length indicative of the speed of the film carried in the cartridge; and FIGS. 2–5 are front elevational views illustrating the cooperation of the apparatus of the present invention with cartridges carrying film of widely different speeds, in the presence and absence of a flash unit mounted to the camera.

DETAILED DESCRIPTION OF THE PREFERRED EMBODIMENTS

Figure 4:
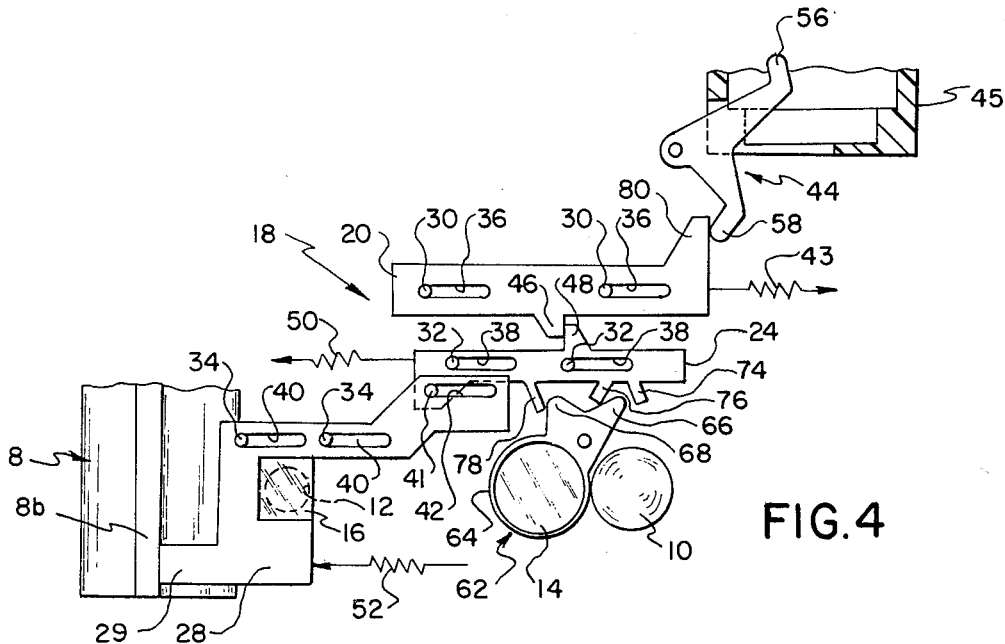

Because photographic cameras are well known, the present description will be directed in particular to elements forming part of or cooperating more directly with the present invention, camera elements not specifically shown or described herein being understood to be selectable from those known in the art.

A preferred embodiment of the invention is utilized in a camera adapted to receive film of different effective film speeds and to expose the film during ambient or flash illumination. The camera may be adapted to receive a film cartridge 8 of the type shown in FIG. 1a, on which is provided a rib at one end suitable for encoding the speed of the film carried thereby. The length or height of the rib may be made to be proportional to the speed of the film carried by the cartridge 8. For purposes of illustrating the invention, a cartridge 8 that carries one of two film speeds will be illustrated with the invention. A first film speed of ASA rating such as, for example, ASA 400 is indicated by a short rib 8a of FIG. 1a, and a second film speed of materially lower ASA rating such as ASA 64 is indicated by a long rib 8b of FIG. 1b.

The preferred embodiment of the invention is shown in FIGS. 2–5. FIG. 2, for example, schematically shows the cartridge 8, a lens 10 and photosensor 12 in a spaced relationship to one another. Depicting such spaced relationship between the cartridge 8, the lens 10 and the photosensor 12 is for purposes of more clearly describing the invention and it is understood that the apparatus would not necessarily appear in the same spaced relationship if shown as incorporated into a camera. In accordance with the invention, neutral density filters 14 and 16 are located to be moved into operative relationship with the lens 10 and photosensor 12 respectively to adjust exposure of the film (not shown). The apparatus operates from information provided by the length of the rib 8a, b and whether or not a flash unit 13 is mounted on the camera, to (1) move the filter 14 over the lens 10 when a flash unit 13 is mounted on the camera, (2) move the filter 16 over the photosensor 12 when film of relatively low speed is in the camera and (3) prevent adjustment of the filter 14 when low-speed film is in the camera.

As shown in FIGS. 2–5, linkage apparatus 18 interconnects the rib 8a, b and the flash unit 13, when mounted on the camera, to move the filters 14 or 16 over the lens 10 or photosensor 12 as required to effect proper exposure for the speed of film in the camera and scene lighting conditions. The linkage 18 comprises three cooperating elements: a first element 20 that is moved (by a flash unit sensor to be discussed later) when a flash unit 13 is mounted to the camera; an intermediate element 24 whose movement, under predetermined conditions, follows the movement of the element 20, and when moved positions the filter 14 into or out of the path of the lens 10; and a third element 28 that carries the filter 14, senses the length of the rib 8a, b and, via the intermediate element 24, couples the sensed rib length with whether or not a flash unit 13 is mounted on the camera. The element 28 is part of a code-sensing device 29, which may be, for example, the type of apparatus disclosed in commonly-assigned copending United States application Ser. No. 566,649 filed Apr. 10, 1975 in the name of Floyd M. Galbraith. The elements 20, 24 and 28 are slidably mounted relative to each other on camera structure, not shown, by pins 30, 32 and 34 respectively, that are received in elongated slots 36, 38 and 40 of the elements 20, 24 and 28 respectively. Additionally, a pin 41 carried by the element 24 rides within a slot 42 of the element 28.

The element 20 is biased by a spring 43 into engagement with a flash unit sensing element 44, and includes a depending tab 46 that engages an upright tab 48 of the intermediate element 24. In the absence of a flash unit 13 mounted on the camera, engagement of the tab 48 with the tab 46 retains the intermediate element 24 in the position of FIGS. 2, 4. A spring 50, weaker than the spring 43, biases the intermediate element 24 in the opposite direction from that which the spring 43 biases the element 20. Thus in the position of FIG. 1, the tabs 46, 48 are biased into interlocking engagement such that the intermediate element 24 may follow movement of the element 20 if the element 28 has not adjusted the filter 16. A spring 52 biases the element 28 in the same direction as the intermediate element 24. The element 28 carries the filter 16 and cooperates with the rib 8a, b to move the filter 16 over to the photosensor 12 only when a cartridge 8 having a long rib 8b is in the camera. When the element 28 is moved to place the filter 16 over the photosensor 12, the left end of the slot 42 abuts against the pin 41 and prevents movement of the element 24 (if a flash unit 13 is mounted on the camera).

The movement of the filter 14 with movement of the intermediate element 24 is accomplished by a filter assembly 62 that includes a filter holder 64, having extensions 66 and 68 positioned to interact with depending fingers 74, 76, 78 of the intermediate element 24. The fingers 76, 78 normally engage the front surface of the extensions 66, 68 respectively. When the intermediate element 24 is moved toward the left (toward its position in which the filter 14 is to be placed over the lens 10), the fingers 76, 78 disengage from the front surfaces of the extensions 66, 68. As the intermediate element 24 continues to move, the finger 74 engages the rear side of extension 66 and rotates the filter assembly 62 in a counterclockwise direction and into alignment with the lens 10. When the flash unit 13 is removed, the tab 46, engaging the tab 48, moves the intermediate element 24 as the element 20 moves under the bias of spring 43. The finger 76 engages the front surface of the extension 66 thereby causing rotation of the filter assembly 62 and causing movement of the filter 14 away from the optical axis of the lens 10. When the intermediate element 24 occupies the position of FIGS. 2, 4, indicating the absence of a flash unit 13 on the camera (or low-speed film in the camera), the filter assembly 62 is prevented from moving inadvertently by the action of the fingers 76, 78 engaging the extensions 66, 68 respectively.

The element 44 that senses the flash unit 13 mounted on the camera may, for example, be a pivotally mounted, two-armed element disposed in a position such that one arm 56 extends into a flash receiving socket 45, and engages and is moved by a flash unit 13 that is mounted on the camera. Another arm engages an upright extension 80 of the element 20 to move the element 20 as the element 44 pivots.

FIGS. 2 and 3 illustrate the operation of apparatus when high-speed film is in the camera, without (FIG. 2) and with (FIG. 3) a flash unit 13 mounted. A cartridge 8 having a shortened rib 8a is inserted. The code-sensing device 29 does not engage the shortened rib 8a and is therefore retained in its furthest position to the left by its spring 52. In such position, the filter 16 is not positioned over the photosensor 12. FIG. 3 illustrates the effect of mounting a flash unit 13 under these conditions. When mounted on the camera, the flash unit 13 engages the arm 56 of sensing element 44 and rotates arm 58 to act upon upright tab 80 of element 20. As a result, the element 20 is moved against the bias of the spring 43. Through the coupling of tabs 46, 48 and the force of the spring 50, the movement of the intermediate element 24 follows the movement of the element 20, and thus causes the filter 14 to move into the optical path of lens 10.

Figure 5:
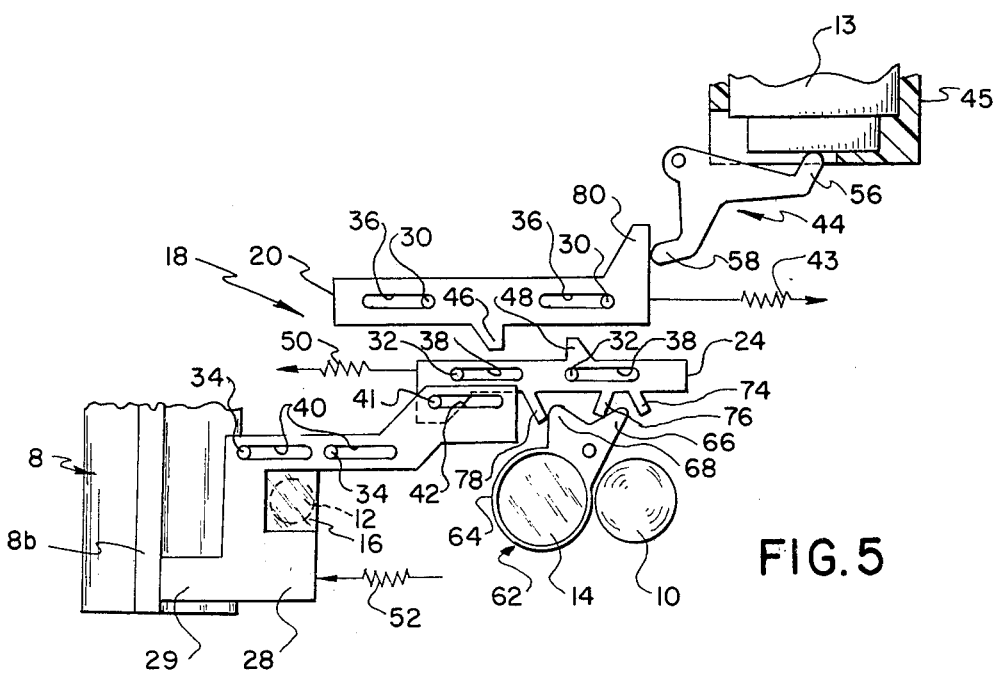

FIGS. 4 and 5 illustrate the operation of the apparatus in the presence of low-speed film without (FIG. 2) and with (FIG. 3) a flash unit 13 mounted on the camera. In FIG. 4, insertion of a cartridge 8 having a long rib 8b indicating the low-speed film, causes the movement of the element 28 against the bias of the spring 52 as a long rib 8b engages the sensing element 29. As illustrated in FIG. 4, when the element 28 is moved against its bias, the filter 16 is placed over the photosensor 12. When the element 28 moves fully to its position in which the filter 16 is placed over the photosensor 12, the pin 41 abuts the left end of the slot 42 to prevent movement of the intermediate element 24 if the flash unit 13 (of FIG. 5) is inserted into the socket 45. Thus when the low-speed film is sensed, the filter 16 is caused to move into a position over the photosensor 12 and the filter 14 is prevented from being moved over the lens 10.

The invention has been described in detail with particular reference to a preferred embodiment thereof, but it will be understood that variations and modifications can be effected within the spirit and scope of the invention.

I claim:
1. In a camera adapted to selectively receive and expose film having different effective film speeds, under both ambient and flash illumination, said film being carried by means coded to indicate the speed of the film, said camera having a film-exposure path and means for removably mounting a flash unit thereon, the improvement comprising:
   a filter selectively movable into and out of said exposure path;
   means, responsive to the mounting of a flash unit on said camera, for urging said filter into said path; and
   film speed code-sensing means, responsive to the presence of a relatively low-speed film in said camera, for rendering said filter urging means ineffective to move said filter into said path.

2. The invention of claim 1 wherein said camera further includes a photosensor and associated circuitry for controlling exposure in accordance with scene illumination and a second filter movable into and out of operative relationship with said photosensor, said second filter being movable into such operative relationship in response to sensing of said low-speed film by said code-sensing means.

* * * * *